US012647276B2

(12) United States Patent
Anderson et al.

(10) Patent No.: US 12,647,276 B2
(45) Date of Patent: Jun. 2, 2026

(54) NETWORK ON CHIP (NoC) MEMORY ADDRESSABLE ENCRYPTION AND AUTHENTICATION

(71) Applicant: XILINX, INC., San Jose, CA (US)

(72) Inventors: James Anderson, Madison, AL (US); Aman Gupta, Sunnyvale, CA (US); James D. Wesselkamper, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 287 days.

(21) Appl. No.: 18/215,140

(22) Filed: Jun. 27, 2023

(65) Prior Publication Data

US 2025/0007724 A1     Jan. 2, 2025

(51) Int. Cl.
H04L 9/32 (2006.01)

(52) U.S. Cl.
CPC ................................. H04L 9/3247 (2013.01)

(58) Field of Classification Search
CPC ..... H04L 9/3247; H04L 45/583; H04L 45/60; H04L 49/109; H04L 63/0428; G06F 15/7825
See application file for complete search history.

(56) References Cited

U.S. PATENT DOCUMENTS 9,859,896 B1      1/2018  Gaide et al.
10,673,439 B1 *   6/2020  Ahmad ............ H03K 19/17728

| | | | |
|---|---|---|---|
| 11,280,829 B1 * | 3/2022 | Poolla | ................ G01R 31/3177 |
| 2020/0125716 A1 * | 4/2020 | Chittamuru | ............. H04W 4/06 |
| 2020/0380121 A1 * | 12/2020 | Pasricha | ............... G06F 21/554 |
| 2021/0021404 A1 * | 1/2021 | Mishra | .................. H04L 9/0618 |
| 2021/0034790 A1 * | 2/2021 | Charles | ................ H04L 9/0825 |
| 2021/0185023 A1 * | 6/2021 | Satpathy | ............... H04W 12/06 |

OTHER PUBLICATIONS

Wang, C. et al. "SolC_H Technology for Heterogenous System Integration," 2022 Symposium on VLSI Techonolgy Y Circuits Digest of Technical Papers, pp. 258-259, 2002.

* cited by examiner

*Primary Examiner* — Kostas J Katsikis
(74) *Attorney, Agent, or Firm* — Patterson + Sheridan, LLP

(57) ABSTRACT

Techniques for network-on-chip (NoC) memory addressable encryption and authentication. In an embodiment, NoC circuitry includes NoC routing circuitry, memory circuitry that stores a security parameter, and security circuitry that secures (e.g., encrypts and/or authenticates) a payload based on the security parameter. The security circuitry may secure the payload before the payload is packetized for transmission through the NoC, after the payload is de-packetized for output to an endpoint, or as the payload transits the NoC. The security circuitry may be centralized or distributed amongst access points of the NoC. Distributed security circuitry may exchange a security parameter over a secure link of the NoC circuitry. The security circuitry may include decryption circuitry that decrypts a response from a first endpoint before the response is packetized for transmission through the NoC, after the response is de-packetized for output to a second endpoint, or as the response transits the NoC.

19 Claims, 11 Drawing Sheets

500

502
Secure a payload within a packet-switched NoC based on a security parameter(s)

504
Output the secured payload from a first IO circuit of the packet-switched NoC to a first endpoint of the packet-switched NoC

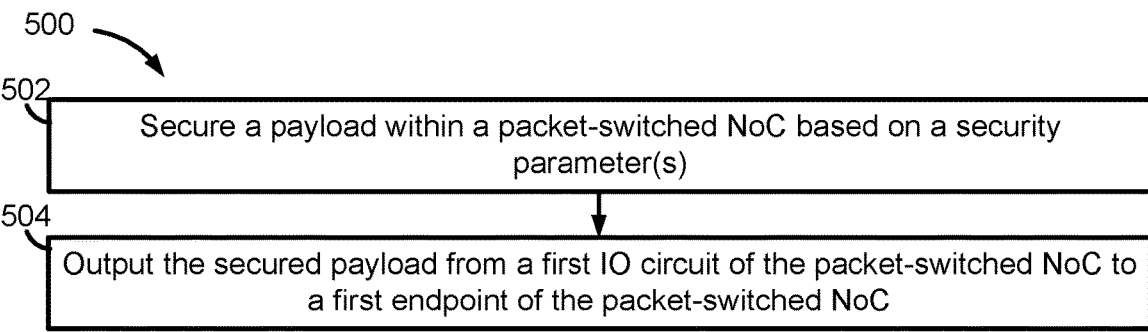

602
Receive the payload from a second endpoint of the packet-switched NoC, at the second IO circuit 604
Secure the payload prior to packetizing the payload at the second IO circuit 606
Packetize the secured payload at the second IO circuit and forward the packetized secured payload to routing circuitry of the packet-switched NoC 608
Receive the packetized secured payload from the routing circuitry, at the first IO circuit 610
De-packetize the secured payload at the first IO circuit and output the de-packetized secured payload from the first IO circuit to the first endpoint

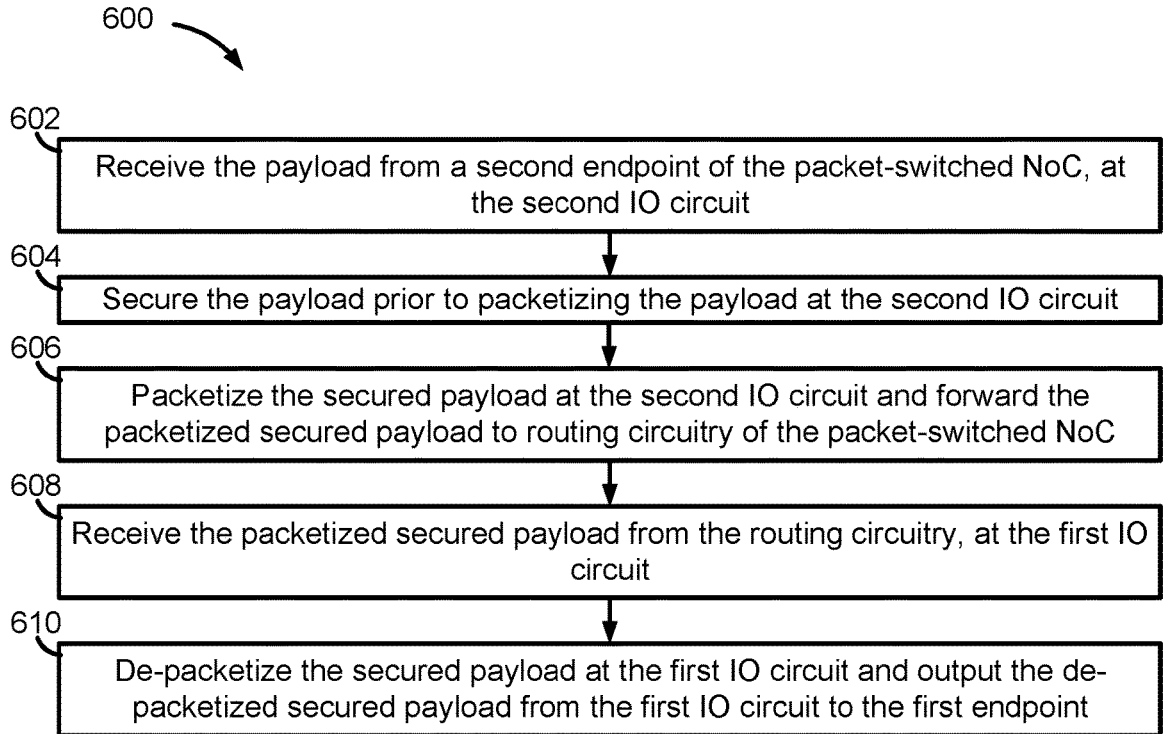

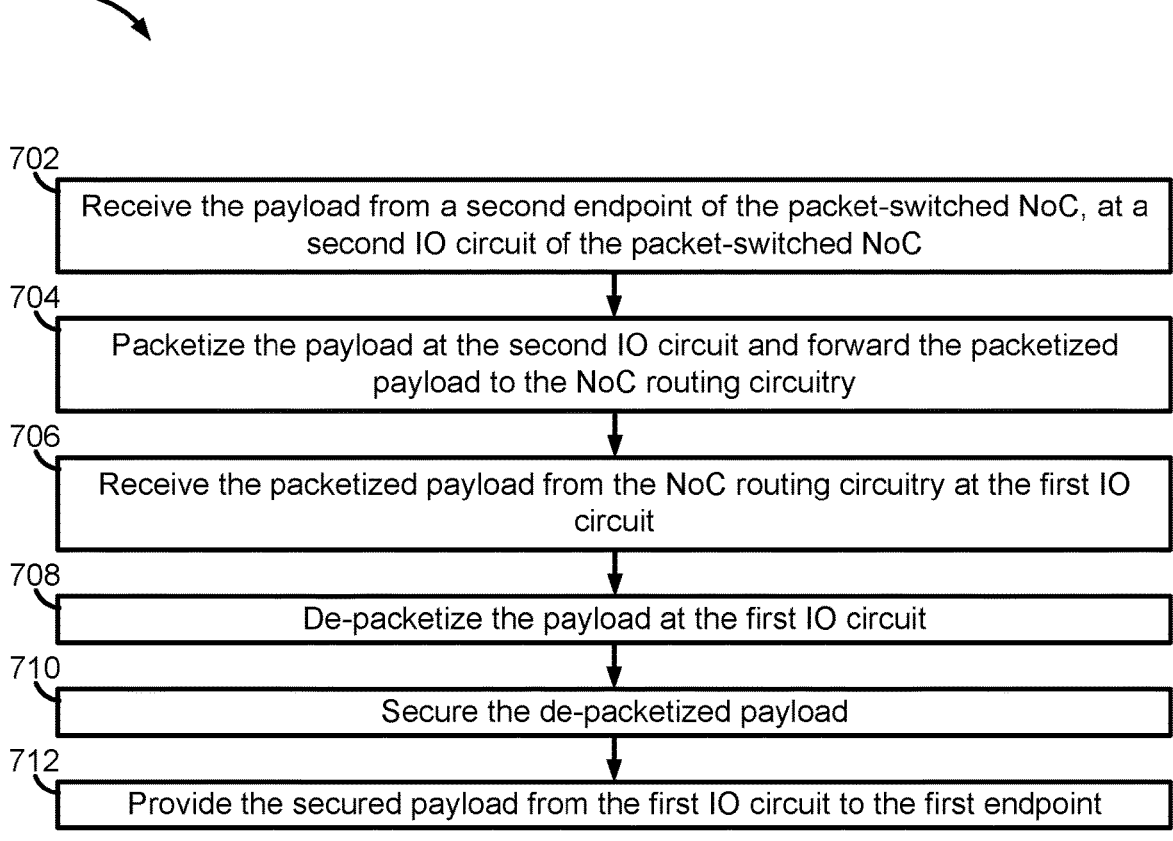

702
Receive the payload from a second endpoint of the packet-switched NoC, at a second IO circuit of the packet-switched NoC 704
Packetize the payload at the second IO circuit and forward the packetized payload to the NoC routing circuitry 706
Receive the packetized payload from the NoC routing circuitry at the first IO circuit 708
De-packetize the payload at the first IO circuit 710
Secure the de-packetized payload 712
Provide the secured payload from the first IO circuit to the first endpoint

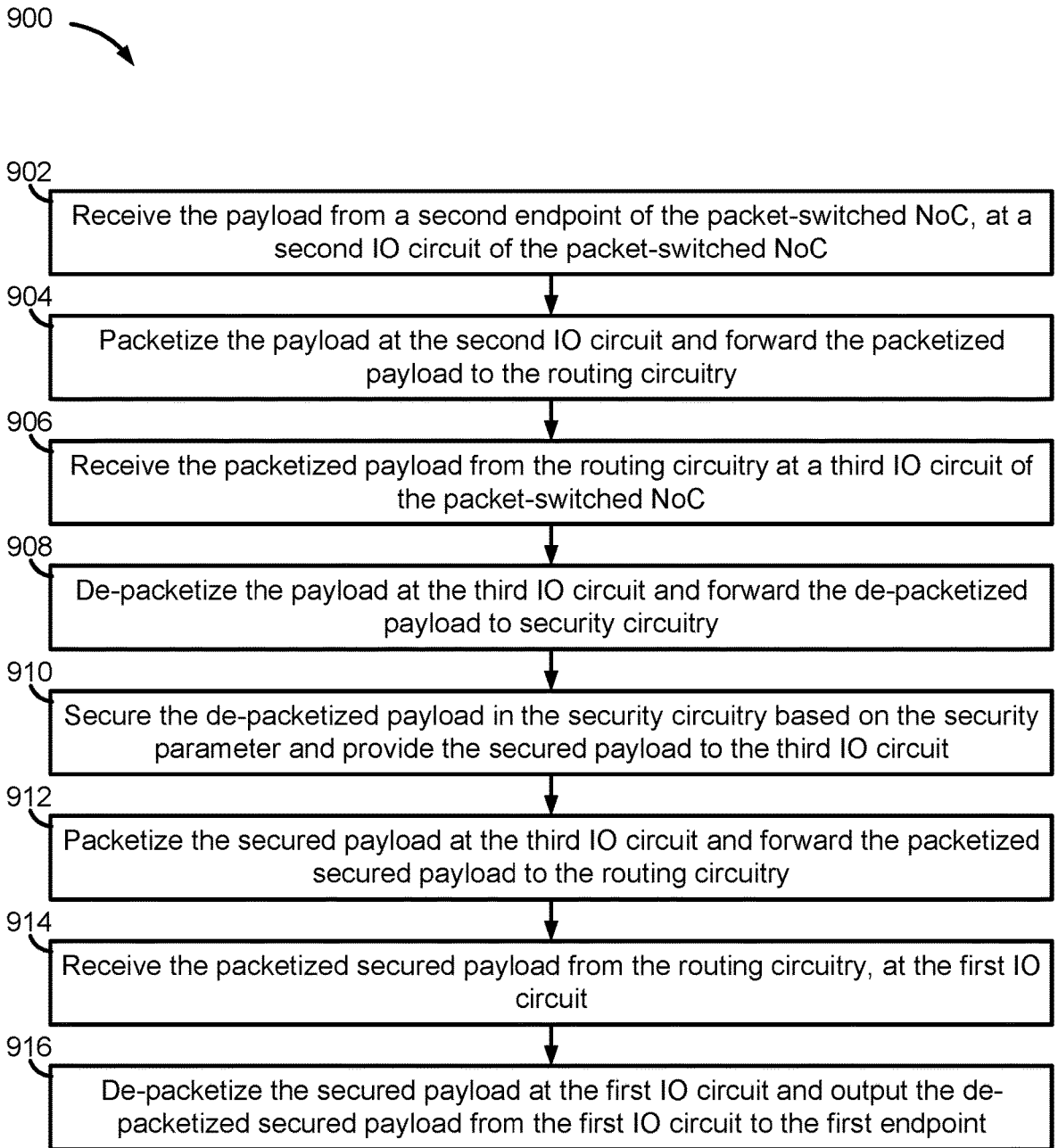

902
Receive the payload from a second endpoint of the packet-switched NoC, at a second IO circuit of the packet-switched NoC 904
Packetize the payload at the second IO circuit and forward the packetized payload to the routing circuitry 906
Receive the packetized payload from the routing circuitry at a third IO circuit of the packet-switched NoC 908
De-packetize the payload at the third IO circuit and forward the de-packetized payload to security circuitry 910
Secure the de-packetized payload in the security circuitry based on the security parameter and provide the secured payload to the third IO circuit 912
Packetize the secured payload at the third IO circuit and forward the packetized secured payload to the routing circuitry 914
Receive the packetized secured payload from the routing circuitry, at the first IO circuit 916
De-packetize the secured payload at the first IO circuit and output the de-packetized secured payload from the first IO circuit to the first endpoint

FIG. 9

NETWORK ON CHIP (NoC) MEMORY ADDRESSABLE ENCRYPTION AND AUTHENTICATION

TECHNICAL FIELD

Examples of the present disclosure generally relate to network-on-chip (NoC) memory addressable encryption and authentication.

BACKGROUND

An integrated circuit (IC) device may include a packet-switched network-on-chip (NoC) that permits endpoints of the NoC (e.g., circuit blocks, processors, and/or memory) to communicate with one another. A communication link between the NoC and an endpoint may be vulnerable, such as when the endpoint is an external endpoint. Examples include external double data rate (DDR) memory and network interface controllers (NICs), and external endpoints linked to the NoC via a peripheral component interconnect express (PCIe) link.

SUMMARY

Techniques for network-on-chip (NoC) memory addressable encryption and authentication are described. One example is an integrated circuit (IC) device that includes network-on-chip (NoC) circuitry that provides a packet-switched NoC. The NoC circuitry includes NoC routing circuitry, security circuitry that secures a payload based on a security parameter, and an input/output (IO) circuit that interfaces between the NoC routing circuitry and a an endpoint of the packet-switched NoC to output the secured payload to the endpoint. The security parameter may include a cryptographic parameter, an authentication parameter, and/or other security parameter(s).

Another example described herein is an IC device that includes NoC circuitry configured to provide a packet-switched NoC. The NoC circuitry includes routing circuitry, security circuitry that secures a payload of a memory access request based on a security parameter, and an IO circuit that interfaces between the NoC routing circuitry and an endpoint of the packet-switched NoC to output the memory access request with the secured payload request to the endpoint. The security parameter may include a cryptographic parameter, an authentication parameter, and/or other security parameter(s). The security circuitry may secure the payload of the memory access request before the memory access request is packetized for transmission through the packet-switched NoC, after the memory access request is de-packetized by the IO circuit, or as the memory access request transits the packet-switched NoC.

Another example described herein is method that includes providing a packet-switched network-on-chip (NoC) with NoC circuitry, where the NoC circuitry include NoC routing circuitry and security circuitry. The method further includes securing a payload with the security circuitry based on a security parameter, before the payload is packetized for transmission through the packet-switched NoC, after the payload is de-packetized for output to a first endpoint of the packet-switched NoC, or as the payload transits the packet-switched NoC. The security parameter may include a cryptographic parameter, an authentication parameter, and/or other security parameter(s).

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 is a flowchart of a high-level method of securing a payload of a packet-switched NoC, according to an embodiment.

FIG. 6 is a flowchart of a method in which the security circuitry secures the payload before the payload is for transmission through the packet-switched NoC, according to an embodiment.

FIG. 7 is a flowchart of a method 700 in which security circuitry 114 secures a payload after the payload is de-packetized for output to an endpoint, according to an embodiment.

FIG. 9 is a flowchart of a method of securing a payload as the payload transits the packet-switched NoC, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
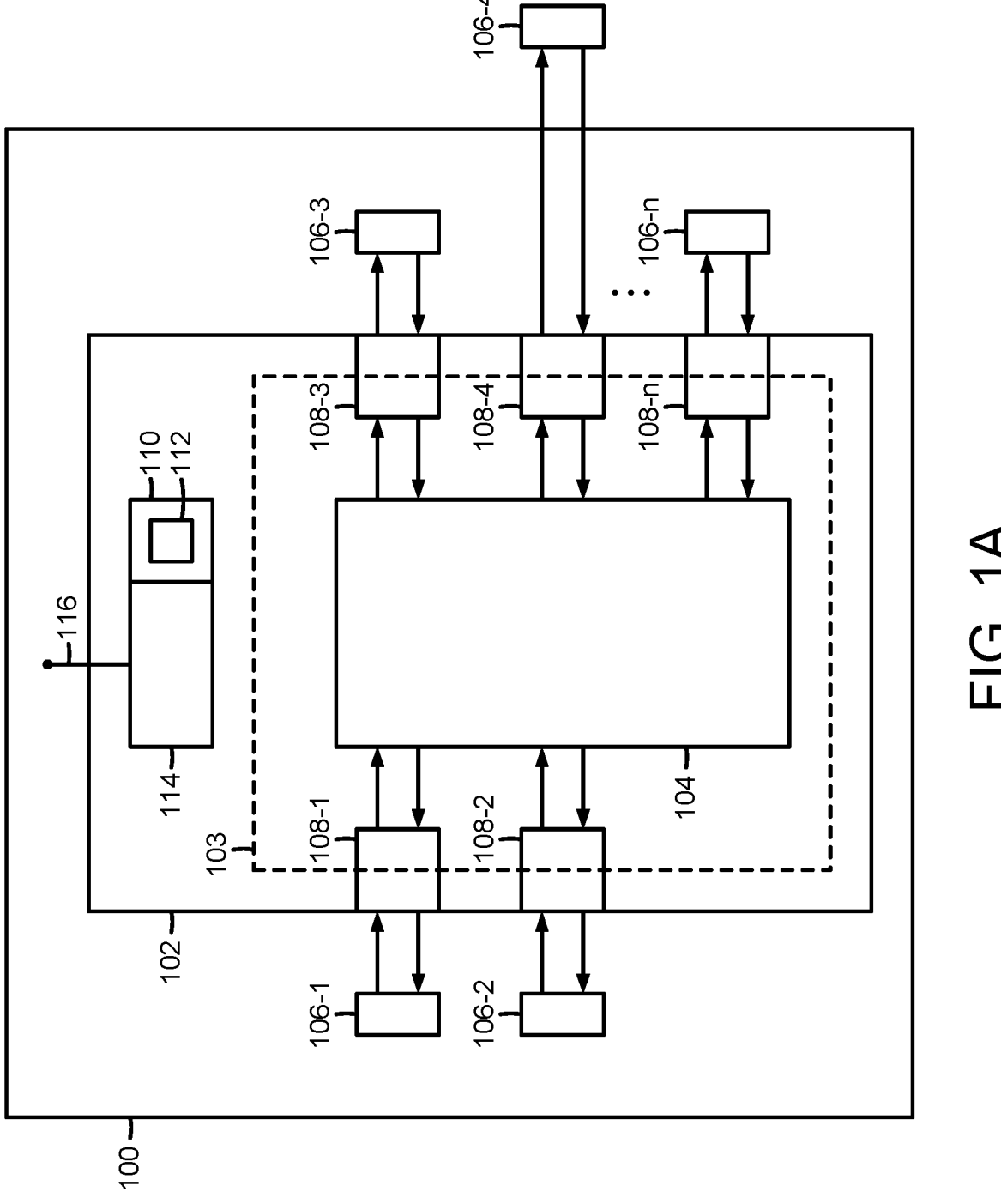
FIG. 1A is a block diagram of an integrated circuit (IC) device that includes network-on-chip (NoC) circuitry that secures (e.g., encrypts and/or authenticates) payloads (e.g., data) within a packet-switched NoC, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for network-on-chip (NoC) memory addressable encryption and authentication.

Embodiments herein include solutions to encrypt and/or authenticate data as the data enters a NoC, as the data exits the NoC, and as the data transits the NoC. Embodiments herein may be useful to secure (e.g., encrypt and/or authenticate) data communicated through the NoC, at any access point of the NoC. The data may be secured while in transit, while in storage, and external to an IC device on which the NoC is implemented, and including response data provided back to the NoC, all while flexibly using the NoC topology to move data efficiently and with performance.

Embodiments herein may be useful to permit various cryptographic and authentication algorithms (i.e., parameters, protocols, and/or policies) including, post quantum crypto algorithms.

Embodiments herein may utilize a dedicated silicon area of NoC circuitry, may permit access for encryption and/or and authentication without impacting an external physical (PHY) interface, which may be useful to permit a user/developer to close timing on a network interface completely within the NoC circuitry, while providing flexible/configurable encryption and authentication polices and protocols.

FIG. 1A is a block diagram of an integrated circuit (IC) device 100 that includes network-on-chip (NoC) circuitry 102 that secures (e.g., encrypts and/or authenticates) payloads (e.g., data) within a packet-switched NoC 103, according to an embodiment. NoC circuitry 102 may be designed as a stand-alone block of circuitry that can be incorporated into various IC devices by an electronic design automation tool (i.e., a pre-designed/tested circuit block to provide a secure packet-switched NoC).

Endpoints 106-1 through 106-n (collectively, endpoints 106), communicate with one another over packet-switched NoC 103. Endpoints 106 may include functional circuitry, subsystems, and/or devices. An endpoint 106 may include, for example, fixed-function circuitry, configurable/programmable circuitry, an embedded processor, and/or memory (e.g., dynamic random access memory, or DRAM). In the example of FIG. 1A, endpoint 106-4 is illustrated as an external or off-device endpoint (e.g., a memory device or host system), and remaining ones of endpoints 106 are illustrated as internal or on-device endpoints. IC device 100 is not limited to the foregoing examples.

IC device 100 may represent an IC die, and endpoints 106, or a subset thereof, may represent respective blocks of circuitry of the die. Alternatively, IC device 100 may represent a multi-die package and endpoints 106, or a subset thereof, may represent respective dies/chiplets of the multi-die package.

Figure 2:
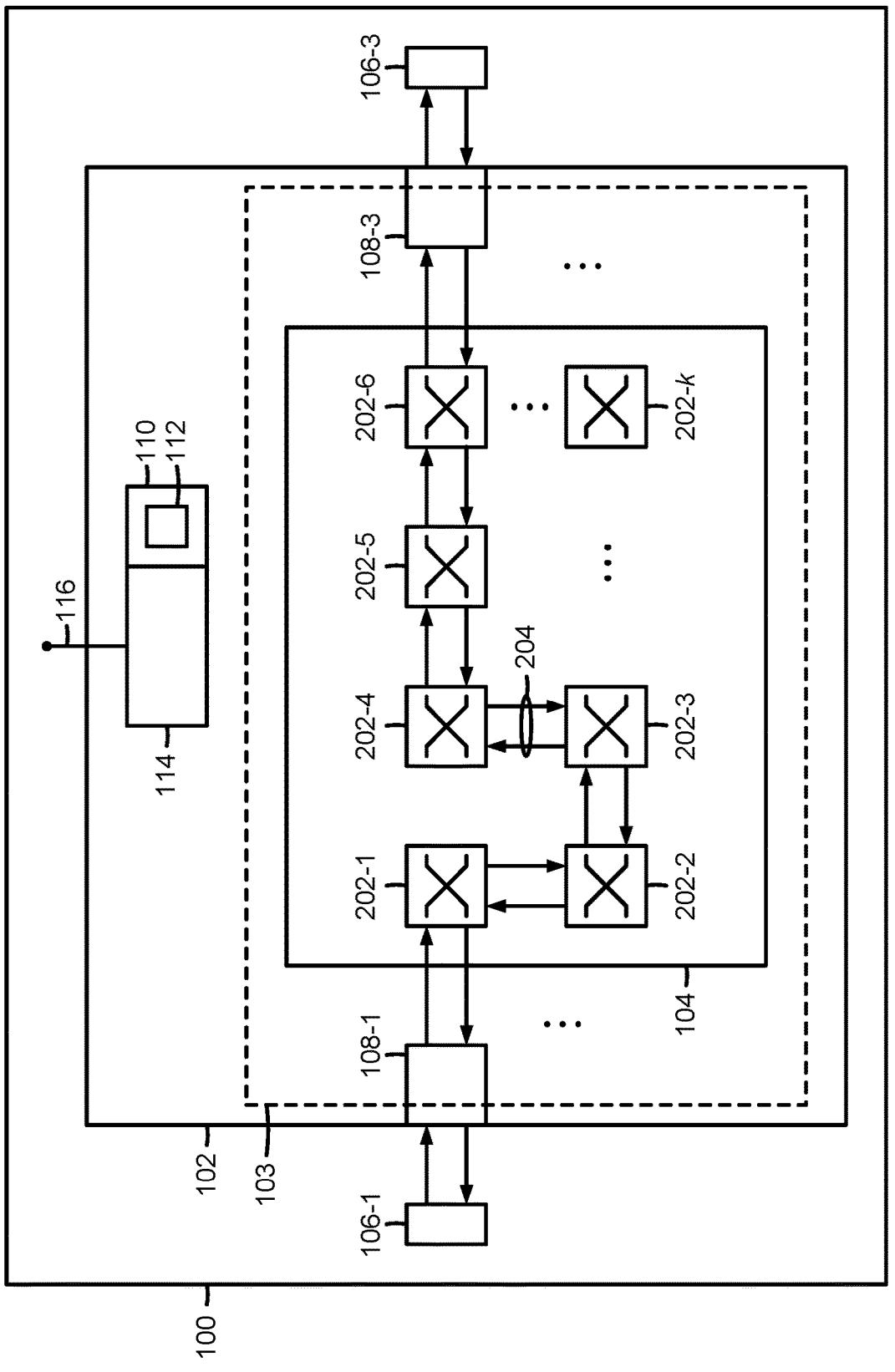
FIG. 2 is a block diagram of the IC device in which NoC routing circuitry includes NoC packet switches (NPSs) and interconnections, according to an embodiment.

NoC circuitry 102 includes NoC routing circuitry 104 that routes packetized communications (e.g., payloads and associated routing information/headers) amongst endpoints 106-1 through 106-n (collectively, endpoints 106). FIG. 2 is a block diagram of IC device 100 in which NoC routing circuitry 104 includes NoC packet switches (NPSs) 202-1 through 202-k (collectively, NPSs 202) and interconnections 204, according to an embodiment.

In FIG. 1A, NoC circuitry 102 further includes input/output (IO) circuits 108-1 through 108-n (collectively, IO circuits 108) that interface between NoC routing circuitry 104 and respective endpoints 106. IO circuits 108 serve as access points to packet-switched NoC 103. IO circuits 108 may packetize and/or de-packetize communications between packet-switched NoC 103 and respective endpoints 106. In the example of FIG. 1A. IO circuits 108 are illustrated as bi-directional IO circuits. Alternatively, one or more of IO circuits 108 may be a unidirectional IO circuit that provides communications to or from packet-switched NoC 103. IO circuits 108 may convert between a NoC packet protocol (NPP) of packet-switched NoC 103, and a protocol(s) of endpoints 106. Example embodiments of IO circuits 108 are provided further below with reference to FIGS. 3 and 4.

NoC circuitry 102 further security circuitry 114 that secures (e.g., encrypts and/or authenticates) payloads based on a security parameter(s) 112, before the payload is provided to an endpoint 106. Security circuitry 114 may secure the payload as the payload enters packet-switched NoC 103 through an IO circuit 108, as the payload exits packet-switched NoC 103 through an IO circuit 108, and/or as the payload transits packet-switched NoC 103. Security parameter(s) 112 may include, without limitation, cryptographic and/or authentication parameters, protocols, and/or policies, such as cryptographic keys, authentication signatures, tags.

In an embodiment, security circuitry 114 receives security parameter(s) 112 via a communication path 116 (e.g., from external memory or from a management system). In an embodiment, security circuitry 114 receives security parameter(s) 112 over communication path 116 as needed (i.e., without storing security parameter(s) 112 for later/subsequent use). Alternatively, NoC circuitry 102 includes memory 110, and security parameter(s) 112 are stored in memory 110 of NoC circuitry 102. Memory 110 may be specifically allocated to security circuitry 114. Memory 110 may, for example, include access-controls to limit access to parameter(s) 112 (e.g., to preclude access via packet-switched NoC 103). The access controls may permit security circuitry to 114 write security parameter(s) 112 to, and read security parameter(s) 112 from memory 110. Alternatively, the access controls may permit a management system to write security parameter(s) 112 to memory 110, and permit security circuitry to 114 to read security parameter(s) 112 from memory 110.

Security circuitry 114 may secure (e.g., encrypt and/or authenticate) all payloads transmitted through packet-switched NoC 103, or may secure selected payloads based on properties or information associated with the payloads. For example, and without limitation, NoC routing circuitry 104 may route all payloads to security circuitry 114, or may selectively route payloads to security circuitry 114 based on an originating address of the payload, a destination address of the payload, and/or other properties of the payload.

Figure 1B:
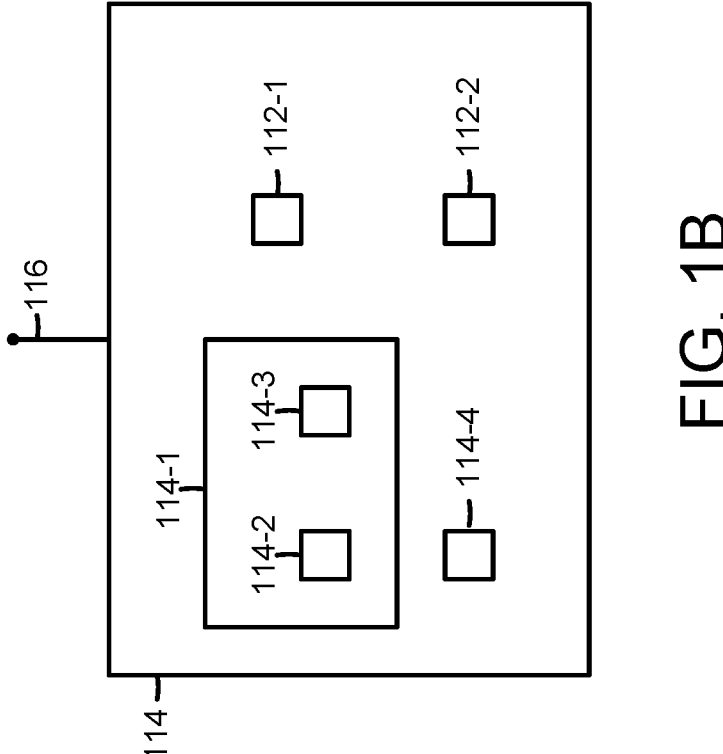
FIG. 1B is a block diagram of memory and security circuitry of the IC device, according to an embodiment.

FIG. 1B is a block diagram of security circuitry 114, according to an embodiment. In the example of FIG. 1B, security circuitry 114 includes cryptographic circuitry 140-1 and authentication circuitry 140-4. Cryptographic circuitry 140-1 may include encryption circuitry 140-2 and/or decryption circuitry 140-3. In other embodiments, encryption circuitry 140-2, decryption circuitry 140-3, and/or authentication circuitry 140-4 are omitted. Security circuitry 114 may include one or more other types of circuitry, such as error detection and/or error correction circuitry.

Encryption circuitry 140-2 encrypts a payload based on a cryptographic parameter 112-1 (e.g., a tag, a key, and/or a hash value/index), before the payload is transmitted to a destination endpoint 106. The payload is thus encrypted as it travels from packet-switched NoC to the destination endpoint 106. Encryption prior to transmission may be useful where a link between packet-switched NoC 103 and the destination endpoint is potentially vulnerable or untrusted, such as where the destination endpoint is off-chip or off-device. Encryption circuitry 114-2 may encrypt a payload as the payload enters packet-switched NoC 103 through an IO circuit 108, as the payload exits packet-switched NoC 103 through an IO circuit 108, and/or as the payload transits packet-switched NoC 103.

Decryption circuitry 140-3 decrypts an encrypted payload based on cryptographic parameter 112-1, before the payload is transmitted to a destination endpoint 106. For example, where endpoint 106-1 issues a read request to endpoint 106-3, endpoint 106-3 may return encrypted read data. In this situation, decryption circuitry 114-3 decrypts the read data prior to transmission of the read data to a destination endpoint 106 (e.g., endpoint 106-1 and/or other endpoint 106). Decryption prior to transmission to a destination endpoint 106 may be useful where a link between packet-switched NoC 103 and the destination endpoint 106 is a trusted link. Decryption prior to transmission may also be useful to avoid sharing cryptographic parameter 112-1 with the destination endpoint 106. Decryption prior to transmission may also be useful where the destination endpoint 106 lacks decryption circuitry and/or to avoid adding decryption circuitry to all endpoints, even endpoints connected via trusted links.

Decryption circuitry 114-3 may decrypt a payload as the payload enters packet-switched NoC 103 through an IO circuit 108, as the payload exits packet-switched NoC 103 through an IO circuit 108, and/or as the payload transits packet-switched NoC 103. Decryption circuitry 114-3 may decrypt a payload at a location at which encryption circuitry 114-2 encrypts payloads and/or at another location(s). Where decryption circuitry 114-3 decrypts a payload at a location(s) other than a location at which encryption circuitry 114-2 encrypts payloads, encryption circuitry 114-2 may share cryptographic parameter 112-1 with decryption circuitry 114-3 over secure a secure link, such as described below with reference to FIG. 1C.

NoC routing circuitry 104 may route an encrypted payload to decryption circuitry 114-3 based on properties or information associated with the payload. For example, and without limitation, NoC routing circuitry 104 may selectively route a payload to decryption circuitry 114-3 based on an originating address of the payload, a destination address of the payload, and/or other properties of the payload.

Authentication circuitry 140-4 authenticates or verifies a payload based on an authentication parameter 112-2 (e.g., an authentication signature or hash value/index). Authentication circuitry 140-4 may compute a signature (e.g., a hash) of a payload, and may verify the signature based on authentication parameter 112-2. Authentication circuitry 140-4 may compute the signature of an encrypted payload and/or an unencrypted payload. Authentication circuitry 140-4 may be utilized alone and/or in combination with cryptographic circuitry 114-1. Authentication circuitry 140-4 may authenticate a payload at a location at which encryption circuitry 114-1 encrypts payloads and/or at another location(s).

In an embodiment, security circuitry 114 is configurable based on configuration parameters (e.g., protocols and/or policies), which may be received from a management system over communication path 116. The configuration parameters (e.g., protocols and/or policies) may include cryptographic and/or authentication methods/algorithms to be employed by security circuitry 114. The configuration parameters may include security parameter(s) 112.

In an embodiment, security circuitry 114 (and memory 110, when included) is centralized, as illustrated in FIG. 1A. Alternatively or additionally, security circuitry 114 and/or memory 110 are distributed amongst multiple IO circuits 108, such as described below with reference to FIG. 1C.

Figure 1C:
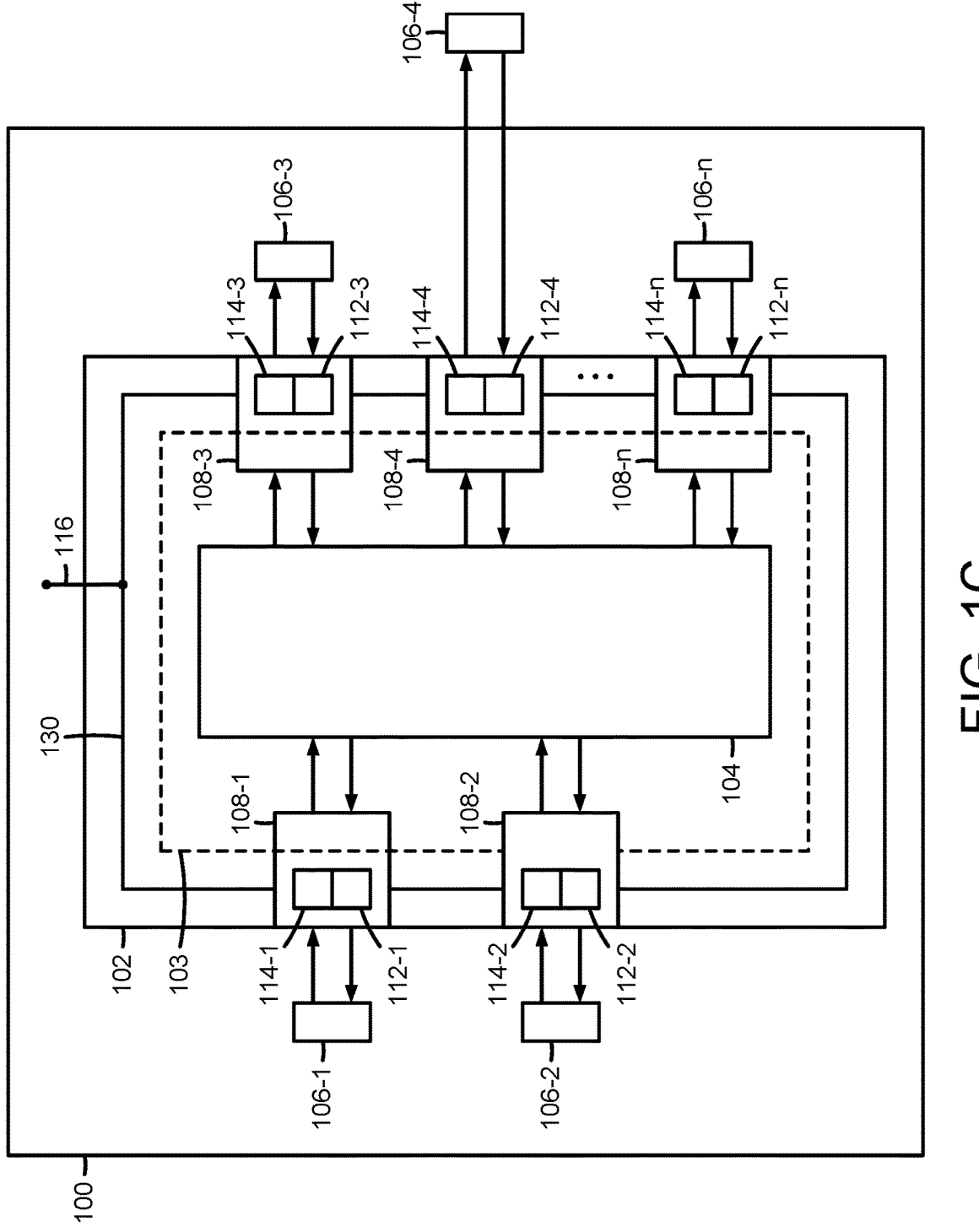
FIG. 1C is a block diagram of the IC device in which IO circuits include respective instances of the security circuitry and the memory, according to an embodiment.

FIG. 1C is a block diagram of IC device 100 in which IO circuits 108, or a subset thereof, include respective instances of security circuitry 114 (and memory 110, when included), according to an embodiment. In the example of FIG. 1C, communication path 116 is linked to the multiple instances of security circuitry 114 to provide security parameter(s) 112 to the respective instances of security circuitry 114. Alternatively, or additionally, NoC circuitry 102 includes one/or more secondary communication channels amongst the multiple instances of security circuitry 114, or a subset thereof, to permit the respective instances of security circuitry 114 to share or exchange security parameter(s) 112 with one another. The one or more secondary communication channels may be inaccessible via packet-switched NoC 103 (e.g., separate hardware/tracks and/or hardware-based protections).

Example embodiments of IO circuits 108 are provided below. In an embodiment, IO circuits 108 communicate with respective endpoints 106 using a standardized point-to-point protocol. The point-to-point protocol may include multiple channels, which may include, without limitation, a write address channel (AW), a write data channel (W), a read address channel (AR), and a read data channel (R). Where the channels are unidirectional, the channels may further include a write response channel (B) to pass write responses back to a requestor. Read responses may be returned to a requestor over the read data channel (R). Separate and independent read and write channels may be useful to support concurrent read and write operations and maximize a bandwidth of the interface. Separate address and data channels for read and write transfers may further improve bandwidth.

IO circuits 108 may include master and/or slave interface circuitry, which may conform to a standardized point-to-point protocol such as, without limitation, an Advanced eXtensible interface (AXI) on-chip communication bus protocol developed by ARM of Cambridge, England. For example, IO circuit 108-1 may include master interface circuitry that permits endpoint 106-1 (e.g., a processor) to initiate communications (e.g., a memory access request) with endpoint 106-3 (e.g., memory), and IO circuit 108-3 may include slave interface circuitry that services requests directed to endpoint 106-3. IO circuit 108-1 may further include slave interface circuitry that permits endpoint 106-1 to service requests from other endpoints 106. IO circuit 108-3 may further include master interface circuitry that permits endpoint 106-3 to initiate communications with other endpoints 106. Example master and slave interface circuitry are provided below with reference to FIGS. 3 and 4, respectively. IO circuits 108 are not, however, limited to master and/or slave circuitry.

Figure 3:
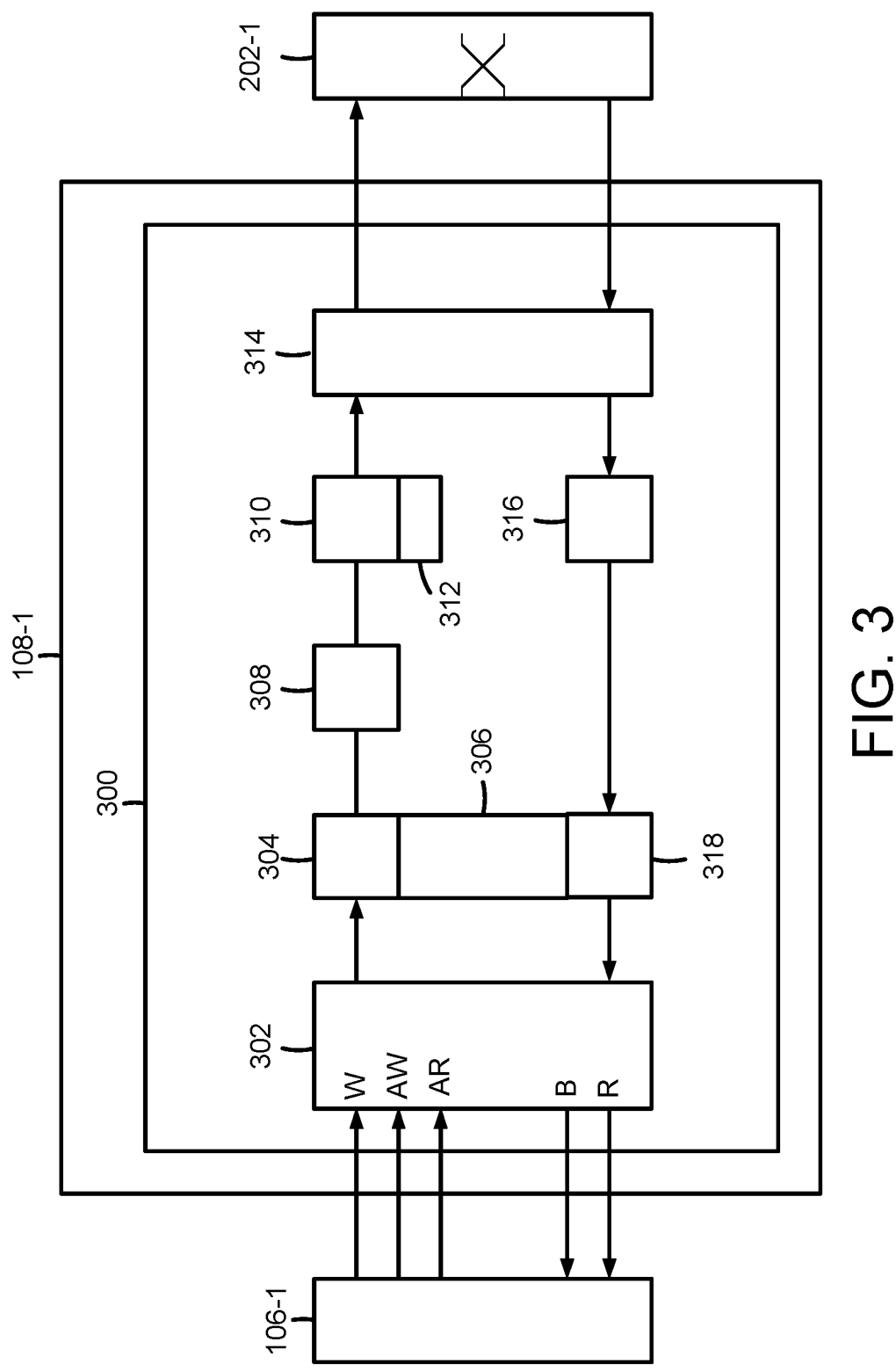
FIG. 3 is a block diagram of an IO circuit that includes a NoC master unit (NMU), according to an embodiment.

FIG. 3 is a block diagram of IO circuit 108-1 including a NoC master unit (NMU) 300, according to an embodiment. An outgoing path, from endpoint 106-1 to NPS 202-1, includes master interface circuitry 302 that interfaces with endpoint 106-1. Master interface circuitry 302 may include an AXI master interface. The outgoing path further includes packetizing circuitry 304, an address map 306, a read re-tagging buffer 308, quality-of-service (QoS) order control circuitry 310, VC mapping circuitry 312, and rate matching and asynchronous data boundary crossing circuitry 314. A response path, from NPS 202-1 to endpoint 106-1, includes rate matching and asynchronous data boundary crossing circuitry 314, re-ordering circuitry 316, de-packetizing circuitry 318, address map 306, and master interface circuitry 302. IO circuit 108-1 may further include a NoC slave unit (NSU), such as described below with reference to FIG. 4.

Figure 4:
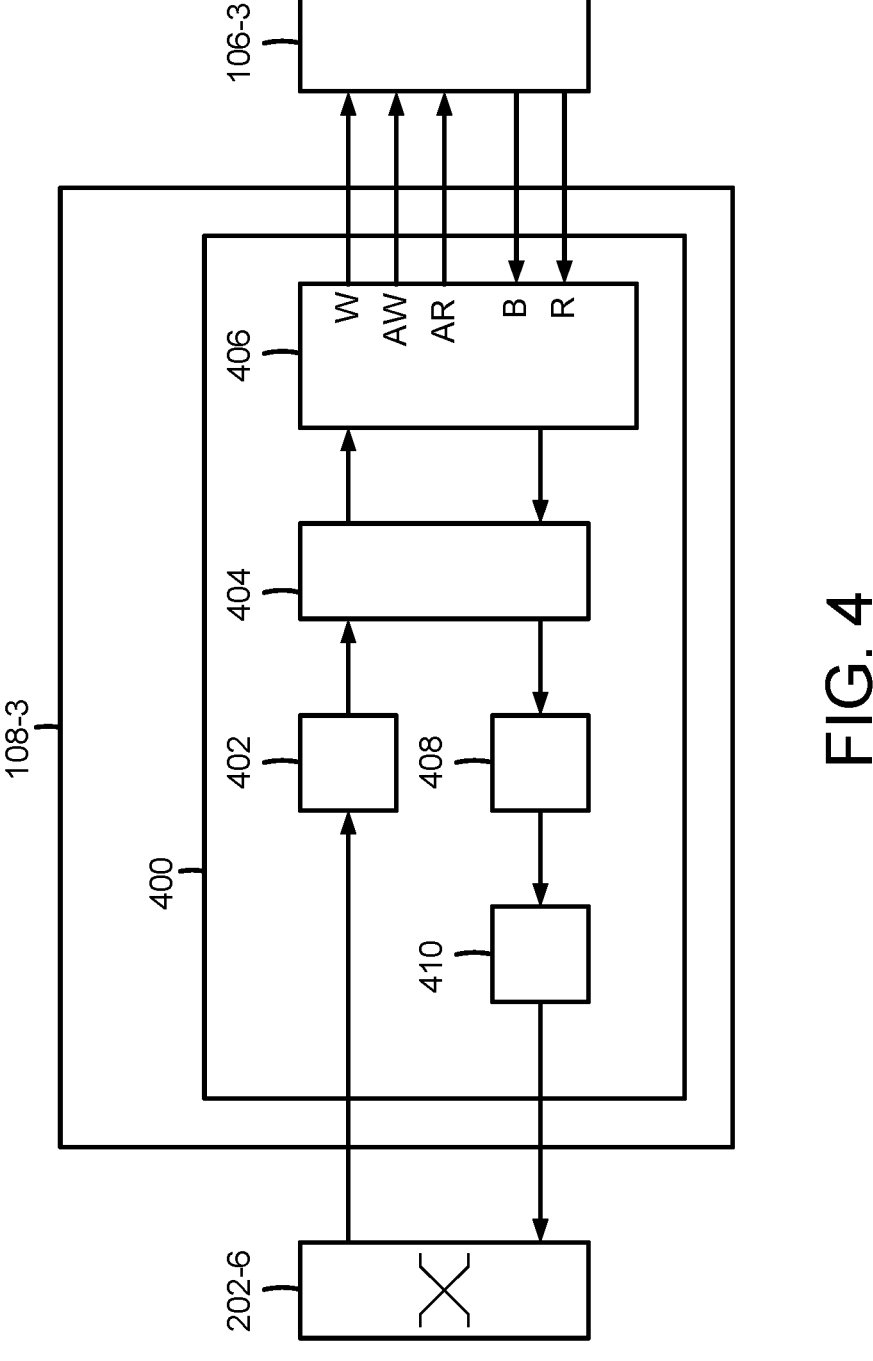
FIG. 4 is a block diagram of an IO circuit that includes a NoC slave unit (NSU), according to an embodiment.

FIG. 4 is a block diagram of IO circuit 108-3 including a NoC slave unit (NSU) 400, according to an embodiment. An incoming path, from NPS 202-6 to endpoint 106-3, includes de-packetizing circuitry 402, rate matching and asynchronous data boundary crossing circuitry 404, and slave interface circuitry 406 that interfaces with endpoint 106-3. Slave interface circuitry 406 may include an AXI slave interface. An outgoing path, from endpoint 106-3 to NPS 202-6, includes slave interface circuitry 406, rate matching and asynchronous data boundary crossing circuitry 404, packetizing circuitry 408, and QoS circuitry 410. IO circuit 108-3 may further include a NMU.

Operation of NMU 300 and NSU 400 are described below for read and write operations initiated by endpoint 106-1 and directed to endpoint 106-3, for illustrative purposes.

Upon receipt of a read request from endpoint 106-1, NMU 300 packetizes the read request and forwards packetized read request to destination NSU 400 via NPS 120-1. NMU 300 may perform one or more of the following functions. NMU 300 may perform asynchronous crossing and rate-matching (e.g., from an AXI master clock domain to a clock domain of the packet-switched NoC), destination lookup of destination NSU 400, address remapping (in cases of virtualization), AXI conversion of the read request (AxAddr, AxSize, AxLen, AxBurst, AxCache) from an AxSizeMaster protocol to a AxSizeNoC protocol, read chopping, read tagging and read-reorder buffer entry insertion to keep track of out-of-order read data returns, packetizing the read request into the NPP, rate limiting and error correction code (ECC) generation, VC-mapping, VC-arbitration, and/or data bus inversion (DBI) generation.

In the example of FIG. 2, the packetized read request passes through NPSs 120-1 through 120-6. NPS 120-1 may perform destination table lookup for a target output port of NPS 120-1. NPS 120-1 may also perform least recently used (LRU) arbitration at the output port.

Upon receipt of the packetized read request, NSU 400 de-packetizes the read request packets and provides the de-packetized read request to endpoint 106-3. NSU 400 may perform one or more of the following functions. NSU 400 may perform ECC checking and correction, AXI-ID compression and AXI exclusive access monitoring, read chopping for downsizing, read tracker entry insertion to keep track of read data interleaving, AXI conversion of the request from the NPP to a protocol of NSU 400 (e.g., from the AxSizeNoC protocol to a AxSizeSlave protocol), asynchronous crossing and rate-matching from the clock domain of the packet-switched NoC to an AXI slave clock domain, and conversion of the read request to a protocol for delivery to endpoint 106-3.

Upon receipt of a read response from endpoint 106-3, NSU 400 packetizes the response and forwards the packetized response to endpoint 106-1 via NPS 120-6. NSU 400 may perform one or more of the following functions. NSU 400 may perform asynchronous crossing and rate-matching from the AXI slave clock domain to the clock domain of the packet-switched NoC, AXI conversion of the read response from the AxSizeSlave to the AxSizeNoC, re-assembly of the read data in a read tracker to match the AxSizeNoC, packetizing of the read response into the NPP of the packet-switched NoC, ECC generation, and VC-mapping and VC-arbitration.

Upon receipt of the read response packet(s), NMU 300 de-packetizes the read response packets and provides the de-packetized read response to endpoint 106-1 based on the point-to-point protocol. NMU 300 may perform one or more of the following functions. NMU 300 may perform data DBI and ECC checking. ECC correction and de-packetizing of the read response packets, re-assembly and reordering of the read data into the request order and AxSizeMaster boundary, AXI conversion of the read response data from the AxSizeNoC to the AxSizeMaster, asynchronous crossing and rate-matching from the clock domain of the packet-switched NoC to a clock domain of NMU 300.

When NMU 300 receives a write request from endpoint 106-1, NMU 300 packetizes the write request and forwards the packetized write request to destination NSU 400 via NPS 120-1. NMU 300 may perform one or more of the following functions. NMU 300 may perform asynchronous crossing and rate-matching from a clock domain of NMU 300 to the clock domain of the packet-switched NoC, destination lookup of destination NSU 400, address remapping (in cases of virtualization), AXI conversion of the write request (AxAddr, AxSize, AxLen, AxBurst, AxCache, writestrobe, and writedata) from the AxSizeMaster protocol to the AxSizeNoC protocol, write chopping, single-slave-per-id (SSID) check for outstanding write transactions with the same AXI-ID but with a different NoC destination ID (DST), write tracker entry insertion, packetizing of the write request into the NPP, rate limiting, ECC generation, VC-mapping, VC-arbitration, and DBI generation.

Upon receipt of the NPP-formatted write request packets, NSU 400 de-packetizes the write request packets and provides the de-packetized write request to endpoint 106-3 based on the point-to-point protocol. NSU 400 may perform one or more of the following functions. NSU 400 may perform de-packetizing of the write request packets, ECC checking and correction, write chopping for downsizing, write tracker entry insertion, AXI conversion of the request from the AxSizeNoC protocol to the AxSizeSlave protocol, and asynchronous crossing and rate-matching from the clock domain of the packet-switched NoC to the clock domain of NSU 400.

Upon receipt of a write response (e.g., confirmation) from endpoint 106-3, NSU 400 packetizes the write confirmation and forwards the write packets to NMU 300 via NPS 120-6. NSU 400 may perform one or more of the following functions. NSU 400 may perform asynchronous crossing and rate-matching from the clock domain of NSU 400 to the clock domain of the packet-switched NoC, merge the write responses in write tracker (in cases of write chopping), packetize the write response in accordance with the NPP, generate ECC, and perform VC-mapping and VC-arbitration.

Upon receipt of the NPP-formatted write response packets, NMU 300 de-packetizes the write response packets and provides the de-packetized write response to endpoint 106-1 based on the point-to-point protocol. NMU 300 may perform one or more of the following functions. NMU 300 may perform DBI and ECC checking, ECC correction and de-packetizing, merge write responses (in cases where write chopping is performed during write requests), and asynchronous crossing and rate-matching from the clock domain of the packet-switched NoC to the clock domain of NMU 300.

Example embodiments and operation of security circuitry 114 are provided below with reference to FIGS. 5 through 9. FIG. 5 is a flowchart of a high-level method 500 of securing a payload of a packet-switched NoC, according to an embodiment. FIGS. 6 through 9 are directed to example applications/implementations of method 500. Method 500 is described below with reference to IC device 100, for a situation in which endpoint 106-1 issues a write request to endpoint 106-3, and in which security circuitry 114 includes encryption circuitry 114-2. Method 500 is not, however, limited to the example of IC device 100, or the example situation.

At 502, security circuitry 114 secures a payload (i.e., data to be written) of the write request based on security parameter 112. Where NoC circuitry 102 includes memory 110, security circuitry 114 may store the security parameter 112 in memory 110 prior to 504.

Security circuitry 114 may encrypt and/or authenticate the payload and/or perform other security operations on the payload. Security circuitry 114 may encrypt and/or authenticate the payload at any point prior to endpoint 106-3, examples of which are provided further below. The payload is thus secured (i.e., encrypted and/or authenticated) before the payload is output to endpoint 106-3.

At 504, IO circuit 108-3 outputs the write request containing the secured payload to endpoint 106-3. Where security circuitry 114 encrypts the payload at 502, endpoint 106-3 may decrypt the payload and execute the write request with respect to the decrypted payload. Endpoint 106-3 may be provided with cryptographic parameter 112-1 (e.g., from a management system). Endpoint 106-3 may issue a response to the write request through packet-switched NoC 103, such as described further above. The response may be encrypted or unencrypted.

FIG. 6 is a flowchart of a method 600 in which security circuitry 114 secures the payload at or within IO circuit 108-1, according to an embodiment. Method 600 is described below for the situation described above, in which endpoint 106-1 issues a write request to endpoint 106-3. Method 600 is not, however, limited to the example situation.

At 602, IO circuit 108-1 receives the write request from endpoint 106-1.

At 604, security circuitry 114 secures (e.g., encrypts and/or authenticates) the payload of the write request based on security parameter 112, at or within IO circuit 108-1. In FIG. 3, security circuitry 114 may secure the payload prior to packetizing circuitry 304 (i.e., at inputs to master interface circuitry 302 or between master interface circuitry 302 and packetizing circuitry 304). IO circuit 108-1 may include an instance security circuitry 114 (and memory 110, when included). Alternatively, the payload may be routed from an input of master interface circuitry 302 or an input of packetizing circuitry 304 to security circuitry 114, and the secured payload may be routed from security circuitry 114 back to IO circuit 108-1.

At 606, packetizing circuitry 304 of IO circuit 108-1 packetizes the write request with the secured payload and forwards the packetized write request containing the secured payload to NPS 202-1.

At 608, IO circuit 108-3 receives the packetized write request containing the secured payload from NPS 202-6.

At 610, de-packetizing circuitry 402 of IO circuit 108-3 de-packetizes the write request containing the secured payload, and outputs the de-packetized write request containing the secured payload to endpoint 106-3.

FIG. 7 is a flowchart of a method 700 in which security circuitry 114 secures a payload at or within IO circuit 108-3, according to an embodiment. Method 700 is described below for the situation described above, in which endpoint 106-1 issues a write request to endpoint 106-3. Method 700 is not, however, limited to the example situation.

At 702, IO circuit 108-1 receives the write request from endpoint 106-1.

At 704, packetizing circuitry 304 of IO circuit 108-1 packetizes the write request and forwards the packetized write request to NPS 202-1.

At 706, IO circuit 108-3 receives the packetized write request from NPS 202-6.

At 708, de-packetizing circuitry 402 of IO circuit 108-3 de-packetizes the write request.

At 710, security circuitry 114 secures (e.g., encrypts and/or authenticates) the payload of the de-packetized write request based on security parameter 112, at or within IO circuit 108-1. In FIG. 4, security circuitry 114 may secure the payload at the output of packetizing circuitry 304, at the output of rate matching and asynchronous data boundary crossing circuitry 404, or at the output of slave interface circuitry 406. In this example, IO circuit 108-3 may include security circuitry 114 and memory 110, or portions thereof. Alternatively, the payload may be routed from the output of packetizing circuitry 304, the output of rate matching and asynchronous data boundary crossing circuitry 404, or the output of slave interface circuitry 406 to security circuitry 114, and the secured payload may be routed security circuitry 114 back to IO circuit 108-3.

At 712, IO circuit 108-3 provides the write request containing the secured payload to endpoint 106-3.

In an embodiment, security circuitry 114 encrypts a payload prior to IO circuit 108-3, and authenticates the payload at or within IO circuit 108-3. In this embodiment, security circuitry 114 may authenticate the encrypted payload, or may decrypt the payload, authenticate the decrypted payload, and re-encrypt the payload for transmission to endpoint 106-3.

Figure 8:
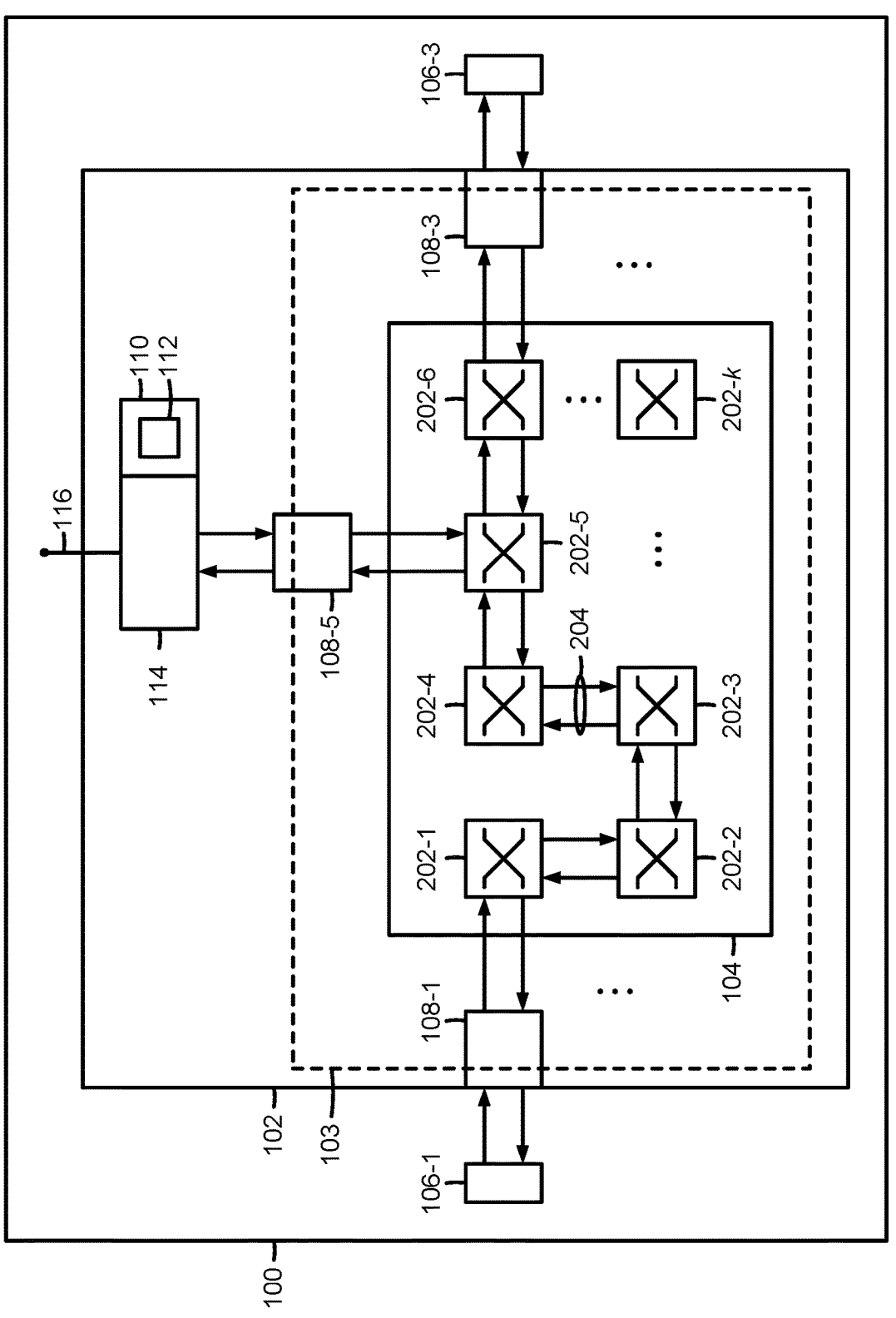
FIG. 8 is a block diagram of the IC device 100 in which the security circuitry secures a payload as the payload transits packet-switched NoC, according to an embodiment.

FIG. 8 is a block diagram of IC device 100 in which security circuitry 114 secures a payload as the payload transits packet-switched NoC 103 via an IO circuit 108-5, according to an embodiment. In the example of FIG. 8, NoC circuitry 102 includes memory 110. Alternatively, memory 110 may be omitted. FIG. 8 is described below with reference to FIG. 9.

FIG. 9 is a flowchart of a method 900 of securing a payload as the payload transits a packet-switched NoC, according to an embodiment. Method 900 is described below for the situation described above, in which endpoint 106-1 issues a write request to endpoint 106-3. Method 900 is not, however, limited to the example situation.

At 902, IO circuit 108-1 receives the write request from endpoint 106-1.

At 904, packetizing circuitry 304 of IO circuit 108-1 packetizes the write request and forwards the packetized write request to NPS 202-1.

At 906, IO circuit 108-5 receives the packetized write request from NPS 202-5 of NoC routing circuitry 104.

At 908, de-packetizing circuitry of IO circuit 108-5 de-packetizes the write request, such as described in one or more examples above, and outputs the payload of the de-packetized write request to security circuitry 114.

At 910, security circuitry 114 secures (e.g., encrypts and/or authenticates) the payload of the de-packetized write request based on security parameter 112, and provides the secured payload to IO circuit 108-5.

In an embodiment, NoC routing circuitry 104 forwards all packets to security circuitry 114 (e.g., via NPS 202-5). Alternatively, NoC routing circuitry 104 may forward selected packets to security circuitry 114, such as described further above.

At 912, IO circuit 108-5 re-packetizes the write request to include the secured payload in place of the original/unsecured payload, such as described in one or more examples above, and forwards the packetized write request containing the secured payload to NPS 202-5.

At 914, IO circuit 108-3 receives the packetized write request containing the secured payload from NPS 202-6.

At 916, de-packetizing circuitry 402 of IO circuit 108-3 de-packetizes the write request containing the secured payload, and outputs the de-packetized write request containing the secured payload to endpoint 106-3.

Figure 10:
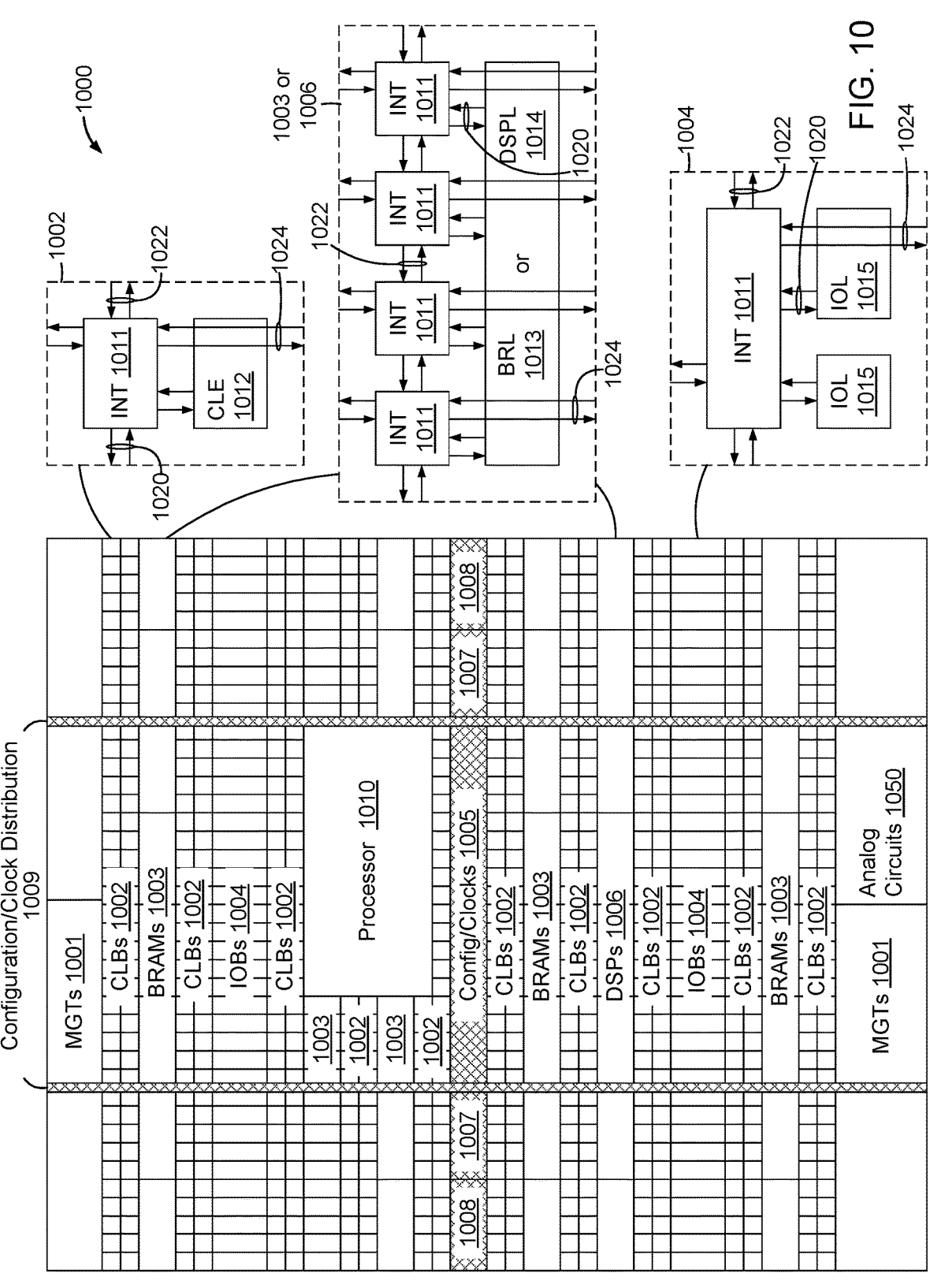
FIG. 10 is a block diagram of configurable circuitry that includes an array of configurable or programmable circuit blocks or tiles, according to an embodiment.

IC device 100 or a portion thereof may include one or more of a variety of types of configurable circuit blocks, such as described below with reference to FIG. 10. FIG. 10 is a block diagram of configurable circuitry 1000, including an array of configurable or programmable circuit blocks or tiles, according to an embodiment. The example of FIG. 10 may represent a field programmable gate array (FPGA) and/or other IC device(s) that utilizes configurable interconnect structures for selectively coupling circuitry/logic elements, such as complex programmable logic devices (CPLDs).

In the example of FIG. 10, the tiles include multi-gigabit transceivers (MGTs) 1001, configurable logic blocks (CLBs) 1002, block random access memory (BRAM) 1003, input/output blocks (IOBs) 1004, configuration and clocking logic (Config/Clocks) 1005, digital signal processing (DSP) blocks 1006, specialized input/output blocks (I/O) 1007 (e.g., configuration ports and clock ports), and other programmable logic 1008, which may include, without limitation, digital clock managers, analog-to-digital converters, and/or system monitoring logic. The tiles further includes a dedicated processor 1010.

One or more tiles may include a programmable interconnect element (INT) 1011 having connections to input and output terminals 1020 of a programmable logic element within the same tile and/or to one or more other tiles. A programmable INT 1011 may include connections to interconnect segments 1022 of another programmable INT 1011 in the same tile and/or another tile(s). A programmable INT 1011 may include connections to interconnect segments 1024 of general routing resources between logic blocks (not shown). The general routing resources may include routing channels between logic blocks (not shown) including tracks of interconnect segments (e.g., interconnect segments 1024) and switch blocks (not shown) for connecting interconnect segments. Interconnect segments of general routing resources (e.g., interconnect segments 1024) may span one or more logic blocks. Programmable INTs 1011, in combination with general routing resources, may represent a programmable interconnect structure.

A CLB 1002 may include a configurable logic element (CLE) 1012 that can be programmed to implement user logic. A CLB 1002 may also include a programmable INT 1011.

A BRAM 1003 may include a BRAM logic element (BRL) 1013 and one or more programmable INTs 1011. A number of interconnect elements included in a tile may depends on a height of the tile. A BRAM 1003 may, for example, have a height of five CLBs 1002. Other numbers (e.g., four) may also be used.

A DSP block 1006 may include a DSP logic element (DSPL) 1014 in addition to one or more programmable INTs 1011. An IOB 1004 may include, for example, two instances of an input/output logic element (IOL) 1015 in addition to one or more instances of a programmable INT 1011. An I/O pad connected to, for example, an I/O logic element 1015, is not necessarily confined to an area of the I/O logic element 1015.

In the example of FIG. 10, config/clocks 1005 may be used for configuration, clock, and/or other control logic. Vertical columns 1009 may be used to distribute clocks and/or configuration signals.

A logic block (e.g., programmable of fixed-function) may disrupt a columnar structure of configurable circuitry 1000. For example, processor 1010 spans several columns of CLBs 1002 and BRAMs 1003. Processor 1010 may include one or more of a variety of components such as, without limitation, a single microprocessor to a complete programmable processing system of microprocessor(s), memory controllers, and/or peripherals.

In FIG. 10, configurable circuitry 1000 further includes analog circuits 1050, which may include, without limitation, one or more analog switches, multiplexers, and/or de-multiplexers. Analog switches may be useful to reduce leakage current.

FIG. 10 is provided for illustrative purposes. Configurable circuitry 1000 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 10.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any
tangible medium that can contain, or store a program for use
by or in connection with an instruction execution system,
apparatus or device.

A computer readable signal medium may include a propagated data signal with computer readable program code
embodied therein, for example, in baseband or as part of a
carrier wave. Such a propagated signal may take any of a
variety of forms, including, but not limited to, electro-
magnetic, optical, or any suitable combination thereof. A
computer readable signal medium may be any computer
readable medium that is not a computer readable storage
medium and that can communicate, propagate, or transport
a program for use by or in connection with an instruction
execution system, apparatus, or device.

Program code embodied on a computer readable medium
may be transmitted using any appropriate medium, includ-
ing but not limited to wireless, wireline, optical fiber cable,
RF, etc., or any suitable combination of the foregoing.

Computer program code for carrying out operations for aspects of the present disclosure may be written in any
combination of one or more programming languages,
including an object oriented programming language such as
Java, Smalltalk, C++ or the like and conventional procedural
programming languages, such as the "C" programming
language or similar programming languages. The program
code may execute entirely on the user's computer, partly on
the user's computer, as a stand-alone software package,
partly on the user's computer and partly on a remote
computer or entirely on the remote computer or server. In the
latter scenario, the remote computer may be connected to the
user's computer through any type of network, including a
local area network (LAN) or a wide area network (WAN), or
the connection may be made to an external computer (for
example, through the Internet using an Internet Service
Provider).

Aspects of the present disclosure are described below
with reference to flowchart illustrations and/or block dia-
grams of methods, apparatus (systems) and computer pro-
gram products according to embodiments presented in this
disclosure. It will be understood that each block of the
flowchart illustrations and/or block diagrams, and combina-
tions of blocks in the flowchart illustrations and/or block
diagrams, can be implemented by computer program
instructions. These computer program instructions may be
provided to a processor of a general purpose computer,
special purpose computer, or other programmable data pro-
cessing apparatus to produce a machine, such that the
instructions, which execute via the processor of the com-
puter or other programmable data processing apparatus,
create means for implementing the functions/acts specified
in the flowchart and/or block diagram block or blocks.

These computer program instructions may also be stored
in a computer readable medium that can direct a computer,
other programmable data processing apparatus, or other
devices to function in a particular manner, such that the
instructions stored in the computer readable medium pro-
duce an article of manufacture including instructions which
implement the function/act specified in the flowchart and/or
block diagram block or blocks.

The computer program instructions may also be loaded
onto a computer, other programmable data processing appa-
ratus, or other devices to cause a series of operational steps
to be performed on the computer, other programmable
apparatus or other devices to produce a computer implemented process such that the instructions which execute on
the computer or other programmable apparatus provide processes for implementing the functions/acts specified in
the flowchart and/or block diagram block or blocks.

The flowchart and block diagrams in the Figures illustrate
the architecture, functionality, and operation of possible
implementations of systems, methods, and computer pro-
gram products according to various examples of the present
invention. In this regard, each block in the flowchart or block
diagrams may represent a module, segment, or portion of
instructions, which comprises one or more executable
instructions for implementing the specified logical function
(s). In some alternative implementations, the functions noted
in the block may occur out of the order noted in the figures.
For example, two blocks shown in succession may, in fact,
be executed substantially concurrently, or the blocks may
sometimes be executed in the reverse order, depending upon
the functionality involved. It will also be noted that each
block of the block diagrams and/or flowchart illustration,
and combinations of blocks in the block diagrams and/or
flowchart illustration, can be implemented by special pur-
pose hardware-based systems that perform the specified
functions or acts or carry out combinations of special
purpose hardware and computer instructions.

While the foregoing is directed to specific examples, other
and further examples may be devised without departing
from the basic scope thereof, and the scope thereof is
determined by the claims that follow.

What is claimed is:
1. An integrated circuit (IC) device, comprising:
a packet-switched network-on-chip (NoC) comprising:
   a first input/output (IO) circuit configured to packetize
      a memory access request to provide a packetized
      memory access request;
   security circuitry configured to receive a configurable
      security parameter via a communication path that is
      inaccessible via the NoC, and to perform a security
      procedure on a payload of the packetized memory
      access request based on the configurable security
      parameter to provide a security-enhanced packetized
      memory access request, wherein the security proce-
      dure comprises one or more of encryption, decryp-
      tion, and authentication;
   a second IO circuit configured to de-packetize one or
      more of the packetized memory access request and
      the security-enhanced packetized memory access
      request to provide a de-packetized memory access
      request; and
   routing circuitry configured to route the packetized
      memory access request from the first IO circuit to the
      security circuitry, and to route the security-enhanced
      packetized memory access request from the security
      circuitry to the second IO circuit.
2. The IC device of claim 1, wherein the security circuitry
is configurable with respect to one or more of a crypto-
graphic method and an authentication method to be
employed by the security circuitry.
3. The IC device of claim 1, wherein:
the security parameter comprises an authentication
   parameter; and
the security circuitry comprises authentication circuitry
   configured to compute a signature of the payload and
   authenticate the signature based on the authentication
   parameter.
4. The IC device of claim 1, wherein:
the security circuitry is further configured to receive the
   security parameter as needed from one or more of a
   management system and external memory.

5. The IC device of claim 1, wherein:

the security circuitry is further configured to encrypt and authenticate the first payload to provide an encrypted and authenticated payload.

6. The IC device of claim 1, wherein:

the second IO circuit is further configured to provide the de-packetized memory access request to a memory device, and to packetize a response from the memory device to provide a packetized response;

the security circuitry is further configured to perform the security procedure on a payload of the packetized response to provide a security-enhanced packetized response; and the routing circuitry is further configured to route the packetized response from the second IO circuit to the security circuitry, and to route the security-enhanced packetized response from the security circuitry to the first IO circuit.

7. The IC device of claim 6, wherein:

the security circuitry comprises first and second security circuits, each configured to perform the security procedure;

the routing circuitry is further configured to route the packetized memory access request from the first IO circuit to the security circuit, and route the security-enhanced packetized memory access request from the first security circuit to the second IO circuit; and the routing circuitry is further configured to route the packetized response from the second IO circuit to the second security circuit, and route the security-enhanced packetized memory access request from the second security circuit to the first IO circuit.

8. The IC device of claim 7, wherein;

the security procedure comprises the encryption;

the second security circuit is further configured to decrypt the security-enhanced packetized memory access request to provide the packetized memory access;

the routing circuitry is further configured to route the security-enhanced packetized memory access request from the second IO circuit to the second security circuit, and to return the packetized memory access request to the second IO circuit; and the second IO circuit is further configured to de-packetize the packetized memory access request to provide the de-packetized memory access request.

9. The IC device of claim 1, wherein:

the security circuitry comprises a security circuit for each of the first and second IO circuits; and the IC device further comprises a secure communication link amongst the security circuits to share the security parameter amongst the security circuits.

10. The IC device of claim 1, wherein:

the security circuitry is configurable with respect to one or more of a security policy and a security protocol.

11. The IC device of claim 1, wherein:

the routing circuitry is further configured to selectively route packetized memory access requests from the first IO circuit to the security circuitry based on properties of the respective packetized memory access requests, wherein the properties comprise one or more of originating addresses and destination addresses of the packetized memory access requests.

12. An integrated circuit (IC) device, comprising:

a packet-switched network-on-chip (NoC), comprising:

a first input/output (IO) circuit configured to packetize a memory access request to provide a packetized memory access request;

security circuitry configured to receive a configurable security parameter via a communication path that is inaccessible via the NoC, and to perform a security procedure on a payload of the packetized memory access request circuit based on the configurable security parameter to provide a security-enhanced packetized memory access request, wherein the security procedure comprises one or more of encryption, decryption, and authentication, and wherein the security circuitry is configurable with respect to one or more of a cryptographic method and an authentication method to be employed by the security circuitry;

a second IO circuit configured to de-packetize one or more of the packetized memory access request and the security-enhanced packetized memory access request to provide a de-packetized memory access request; and routing circuitry configured to route the packetized memory access request from the first IO circuit to the security circuitry, and to route the security-enhanced packetized memory access request from the security circuitry to the second IO circuit.

13. The IC device of claim 12, wherein:

the second IO circuit is further configured to provide the de-packetized memory access request to a memory device, and to packetize a response from the memory device to provide a packetized response;

the security circuitry is further configured to perform the security procedure on a payload of the packetized response to provide a security-enhanced packetized response; and the routing circuitry is further configured to route the packetized response from the second IO circuit to the security circuitry, and to route the security-enhanced packetized response from the security circuitry to the first IO circuit.

14. The IC device of claim 12, wherein the security parameter comprises an authentication parameter, and wherein the security circuitry comprises:

authentication circuitry configured to authenticate the payload based on a signature of the payload and the authentication parameter.

15. The IC device of claim 12, wherein the NoC further comprises:

memory configured to store the security parameter.

16. An integrated circuit (IC) device, comprising:

a packet-switched network-on-chip (NoC), comprising:

a first input/output (IO) circuit configured to packetize memory access requests to provide packetized memory access requests;

security circuitry configured to receive a configurable security parameter via a communication path that is inaccessible via the NoC, and to perform a security procedure on payloads of the packetized memory access requests based on the configurable security parameter to provide security-enhanced packetized memory access requests, wherein the security procedure comprises one or more of encryption, decryption, and authentication;

a second IO circuit configured to de-packetize one or more of the packetized memory access requests and the security-enhanced packetized memory access requests to provide de-packetized memory access requests; and routing circuitry configured to selectively route the packetized memory access requests from the first IO circuit to the security circuitry based on properties of the respective packetized memory access requests, and to route the security-enhanced packetized memory access requests to the second IO circuit, wherein the properties comprise one or more of originating addresses and destination addresses of the packetized memory access requests.

17. The IC device of claim 16, wherein:

the second IO circuit is further configured to provide the de-packetized memory access requests to a memory device, and to packetize a response from the memory device to provide a packetized response;

the security circuitry is further configured to perform the security procedure on a payload of the packetized response to provide a security-enhanced packetized response; and the routing circuitry is further configured to route the packetized response from the second IO circuit to the security circuitry, and to route the security-enhanced packetized response from the security circuitry to the first IO circuit.

18. The IC device of claim 17, wherein:

the security circuitry comprises first and second security circuits, each configured to perform the security procedure;

the routing circuitry is further configured to route the packetized memory access requests from the first IO circuit to the first security circuit, and route the security-enhanced packetized memory access requests from the first security circuit to the second IO circuit; and the routing circuitry is further configured to route the packetized response from the second IO circuit to the second security circuit, and route the security-enhanced packetized memory access requests from the second security circuit to the first IO circuit.

19. The IC device of claim 18, wherein:

the security procedure comprises the encryption;

the second security circuit is further configured to decrypt the security-enhanced packetized memory access request to provide the packetized memory access;

the routing circuitry is further configured to route the security-enhanced packetized memory access request from the second IO circuit to the second security circuit, and to return the packetized memory access request to the second IO circuit; and the second IO circuit is further configured to de-packetize the packetized memory access request to provide the de-packetized memory access request.

* * * * *